US008585364B2

(12) United States Patent
Kosch

(10) Patent No.: US 8,585,364 B2
(45) Date of Patent: Nov. 19, 2013

(54) VERTICAL AXIS WIND TURBINE

(76) Inventor: Alois J. Kosch, Columbus, NE (US)

( * ) Notice: Subject to any disclaimer, the term of this patent is extended or adjusted under 35 U.S.C. 154(b) by 477 days.

(21) Appl. No.: 13/065,372

(22) Filed: Mar. 21, 2011

(65) Prior Publication Data

US 2012/0243990 A1      Sep. 27, 2012

(51) Int. Cl.
*F03D 7/06* (2006.01)
*F03D 3/06* (2006.01)

(52) U.S. Cl.
USPC ............................................................. 416/12

(58) Field of Classification Search
USPC ................................. 416/12, 206, 113, 17, 9
See application file for complete search history.

(56) References Cited

U.S. PATENT DOCUMENTS

| | | | | |
|---|---|---|---|---|
| 987,645 | A * | 3/1911 | O'Toole | 416/17 |
| 3,743,848 | A | 7/1973 | Strickland | |
| 4,137,009 | A * | 1/1979 | Telford | 416/24 |
| 4,218,184 | A | 8/1980 | McPherson et al. | |
| 4,247,251 | A * | 1/1981 | Wuenscher | 416/24 |
| 4,494,007 | A | 1/1985 | Gaston | |
| 4,496,283 | A | 1/1985 | Kodric | |
| 4,551,631 | A | 11/1985 | Trigilio | |
| 4,979,871 | A * | 12/1990 | Reiner | 415/4.2 |
| 6,379,115 | B1 * | 4/2002 | Hirai | 416/17 |
| 6,779,966 | B2 | 8/2004 | Smith, II | |
| 6,840,738 | B1 | 1/2005 | Swanberg | |
| 7,258,527 | B2 | 8/2007 | Shih | |
| 7,385,302 | B2 | 6/2008 | Jonsson | |
| 7,550,865 | B2 | 6/2009 | Jonsson | |
| 7,665,966 | B2 * | 2/2010 | Warszewski | 416/17 |
| 7,677,862 | B2 | 3/2010 | Boatner | |
| 7,780,411 | B2 | 8/2010 | Yan | |
| 7,789,624 | B2 * | 9/2010 | Appa et al. | 416/41 |
| 2008/0213083 | A1 | 9/2008 | Unno | |
| 2009/0066088 | A1 | 3/2009 | Liang | |
| 2009/0167030 | A1 | 7/2009 | Watkins | |
| 2009/0236858 | A1 | 9/2009 | Johnson | |

* cited by examiner

*Primary Examiner* — Nathaniel Wiehe
*Assistant Examiner* — Eldon Brockman
(74) *Attorney, Agent, or Firm* — Dennis L. Thomte; Thomte Patent Law Office LLC

(57) ABSTRACT

A vertical axis wind turbine is disclosed which includes an upstanding tower. A plurality of radially spaced-apart airfoil supports are rotatably mounted on the tower which extend outwardly therefrom. A generally vertically disposed airfoil blade is pivotally secured, about a vertical axis, to the outer end of each of the airfoil supports. A wind vane is secured to each of the airfoil blades which causes pivotal movement of the associated airfoil blade relative to the associated airfoil support in response to wind direction. A mechanism interconnects each of the airfoil blades to the associated wind vane which causes pivotal displacement of the airfoil blade with respect to the associated wind vane and wind flow with the pivotal displacement being of a magnitude and direction to cause a forward thrust to the airfoil blade from wind acting on the airfoil blade.

1 Claim, 11 Drawing Sheets

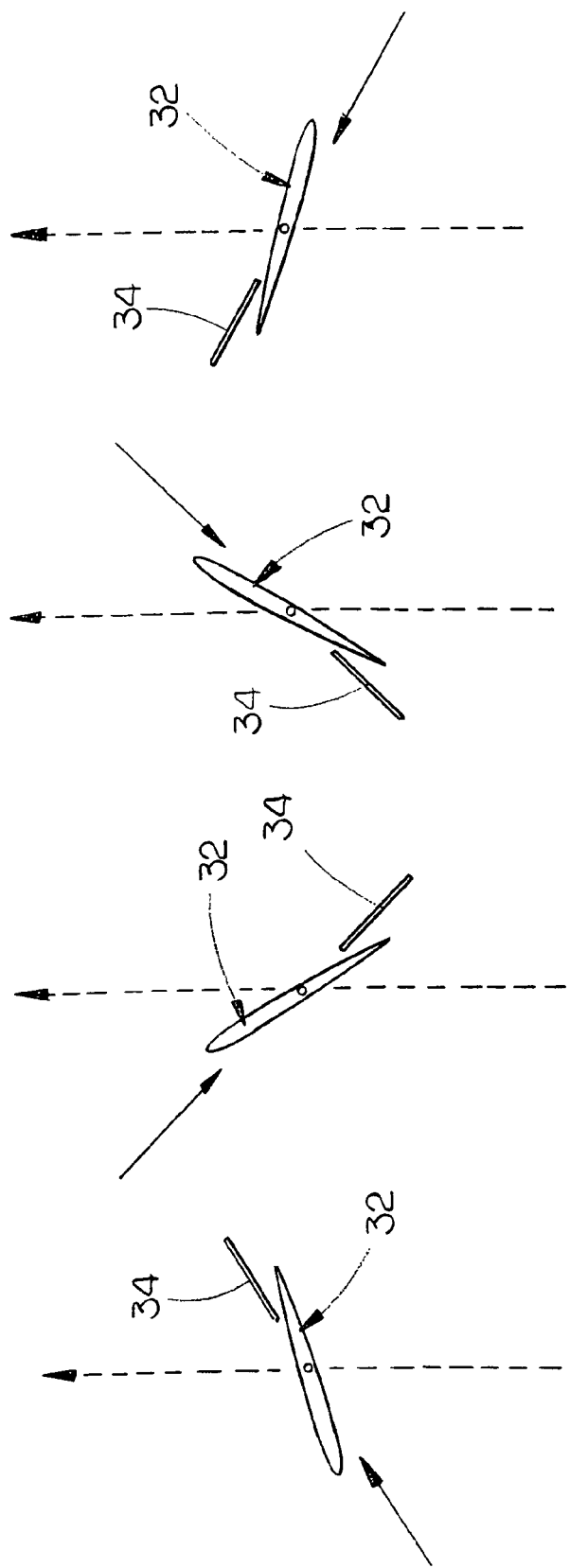

VERTICAL AXIS WIND TURBINE

BACKGROUND OF THE INVENTION

1. Field of the Invention

This invention relates to a wind turbine and more particularly to a vertical axis wind turbine. Even more particularly, the invention relates to a vertical axis wind turbine wherein a wind vane is coupled to each blade which aims the blade into the air flow at a given angle of attack.

2. Description of the Related Art

Many types of wind turbines have been previously provided. Perhaps the most popular type of wind turbine is termed a horizontal axis wind turbine. In horizontal axis wind turbines, a large and heavy nacelle is mounted on the upper end of a robust tower which must have sufficient strength to withstand wind forces, rotational torque as well as being robust enough to support the weight of the generator and electrical equipment associated therewith. A horizontally disposed drive shaft extends from the nacelle and usually has three rotor blades secured thereto.

Many types of vertical axis wind turbines have also been previously provided. In the vertical axis wind turbines, a plurality of vertically disposed blades are attached to a vertically disposed drive shaft which is operatively coupled to a generator and associated with electrical equipment with the generator and associated electrical equipment usually being located on the ground near the wind turbine. For the vertical axis wind turbines to be efficient, the blades must be individually selectively pivoted about a vertical axis so that the blades are not disposed at an angle to the air flow, during the rotation of the entire blade assembly, which would "fight" or retard the rotation of the drive shaft by the other blades in the blade assembly.

Some of the designers of the vertical axis wind turbines have attempted to solve the above problem by employing a single wind vane which simultaneously causes pivotal movement of all of the blades of the blade assembly.

Applicant believes that vertical axis wind turbines are less expensive for a given power output than horizontal axis wind turbines for several reasons. First, the blades of a vertical axis wind turbine will be less expensive to fabricate than the blades of a horizontal axis wind turbine since the blades of the vertical axis turbine are of a uniform cross-section from end-to-end, are not tapered and are not twisted. The blades of a vertical axis wind turbine are also less expensive than the blades of a horizontal axis wind turbine since they can be made much lighter since they can be supported at both ends thereof.

Additionally, the blades of a vertical axis wind turbine will produce more power than the blades of a horizontal axis wind turbine since the entire length of the blades of the vertical axis wind turbine move at the maximum and uniform velocity through the air and since each blade crosses the wind path twice per revolution.

The tower of a vertical axis wind turbine is also less expensive than the tower of a horizontal axis wind turbine. Since the blades of a vertical axis turbine are never close to the tower, the tower can be supported with guy wires resulting in much lighter construction of the tower. The tower of a vertical axis wind turbine is never subject to a bending moment due to the gyroscopic reaction of turning a rotating mass (the blades) to follow a changing wind direction which is required in horizontal axis wind turbines. The tower of a vertical axis wind turbine is also less expensive than the tower of a horizontal axis wind turbine since the tower does not have to support the weight of complex and heavy generation equipment at the upper end thereof. Further, the tower of a vertical axis wind turbine does not require any nacelle support or yaw drive. In a vertical axis wind turbine, the generator and electrical equipment therefor is located at ground level and since the diameter of the generator is not restrained, the use of a large diameter slow-speed generator will eliminate the need for speed increased gearing.

Additionally, it is believed that vertical axis wind turbines are more efficient than horizontal axis wind turbines in that the frontal area thereof is rectangular rather than circular. In a vertical axis wind turbine, the entire mass of air flowing through the frontal area thereof is directed more uniformly thereby causing less turbulence to effect other turbines in the area. Additionally, the entire length of each blade passes through the air at the same velocity as opposed to horizontal wind axis wind turbines. Further, it is believed that vertical axis wind turbines will require less maintenance since there is no speed increasing gear box required nor is there any need for electrical or hydraulic sources needed for pitch and yaw control.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A vertical axis wind turbine is provided which includes a vertically disposed tower or support having upper and lower ends. A rotatable drive shaft extends through the tower and has upper and lower ends. The lower end of the drive shaft is operatively connected to a conventional generator or the like. A plurality of radially spaced-apart airfoil supports are secured to the drive shaft at the upper end thereof which extend outwardly therefrom. A generally vertically disposed airfoil blade, having upper and lower ends, is pivotally secured, about a vertical axis, to the outer end of each of the airfoil supports. Each of the airfoil blades have a leading edge and a trailing edge and have a cross section which may be termed "tear drop shaped." The leading edge of each of the airfoil blades is arcuate and has a greater thickness than the trailing edge of the airfoil blade.

A wind vane is operatively secured to each of the airfoil blades which causes pivotal movement of the associated airfoil blade relative to the associated airfoil support in response to wind direction. A mechanism interconnects each of the airfoil blades to the associated wind vane which causes pivotal displacement of the airfoil blade with respect to the associated wind vane with the pivotal displacement being of a magnitude and direction to cause a forward thrust to the airfoil blade from wind acting on the airfoil blade. The forward thrust causes the airfoil blade to be moved at a greater speed than the speed of the wind.

In a second embodiment, each of the airfoil blades have upper and lower blade sections which are pivotally secured together about a vertical axis. In the second embodiment, a wind vane is operatively secured to each of the upper and lower blade sections of each of the airfoil blades. In the second embodiment, one of the interconnecting mechanisms is associated with each of the upper and lower blade sections of each of the airfoil blades. In each of the embodiments, a counter weight is coupled to each of the wind vanes.

It is therefore a principal object to provide an improved vertical axis wind turbine.

A further object of the invention is to provide an improved vertical axis wind turbine which includes means for displacing the airfoil blades with respect to their associated wind vanes so that the angle of attack of the wind acting thereon will cause a forward thrust to the airfoil blade.

A further object of the invention is to provide a vertical axis wind turbine which represents an improvement for the prior art vertical axis wind turbines.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
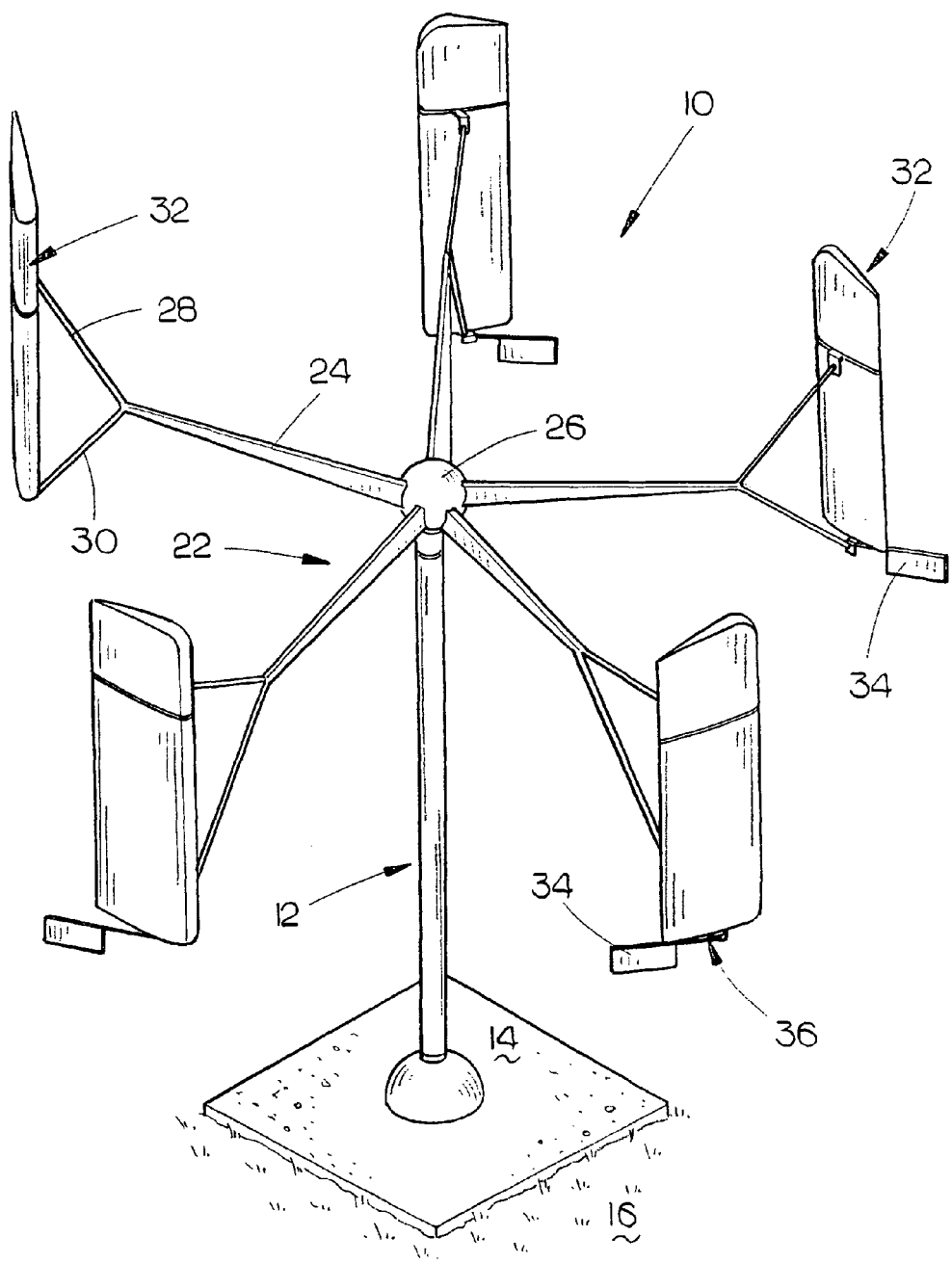
FIG. 1 is a perspective view of a first embodiment of the invention.

In FIG. 1, the numeral 10 refers to a first embodiment of the vertical axis wind turbine of this invention. Wind turbine 10 includes an upstanding hollow pole or tower 12, the lower end of which is secured to a foundation 14 embedded in the ground 16. A drive shaft 18 is rotatably positioned in the tower 12 and has a drive gear 20 mounted at its lower end which is coupled to a conventional generator. The numeral 22 refers to a blade support system which is rotatably mounted on the upper end of tower 12 which is coupled to the upper end of drive shaft 18 to rotate the same as it rotates. Blade support system 22 includes a plurality of support arms 24 which extend radially outwardly from a central hub 26. Brace 28 extends upwardly and outwardly from the outer end of each support arm 24 and a brace 30 extends downwardly from the outer end of each support arm 24. The outer ends of braces 28 and 30 are secured to a vertically disposed blade 32 having a cross-section similar to an airplane wing having a tear drop shape. A wind vane 34 is associated with each blade 32 and is connected thereto by a mechanism 36 which pivots the blade 32 to the proper position as the blade support system 22 revolves around the tower 12. As seen in FIG. 1, the wind turbine 10 has 5 radially spaced blades 32. The wind turbine 10 could have more or less blades 32 than 5 blades.

Figure 2:
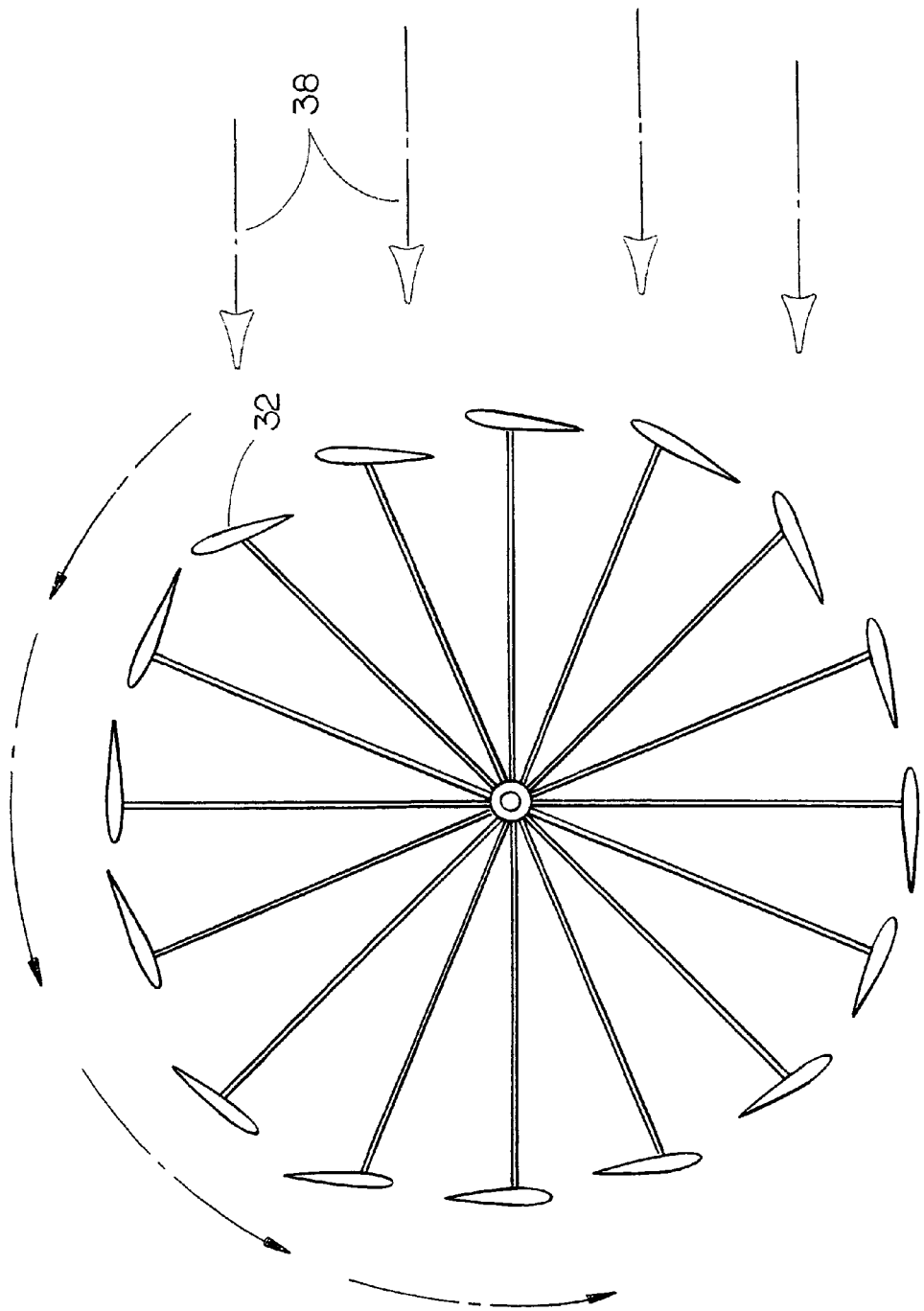
FIG. 2 is a top schematic view illustrating the various positions of one of the blades of the first embodiment during one revolution thereof.

FIG. 2 is a schematic view which illustrates the various positions a single blade 32 will have during one complete revolution of the blade support system when the wind is coming from the right side of FIG. 1 as indicated by the arrows.

Figure 3:
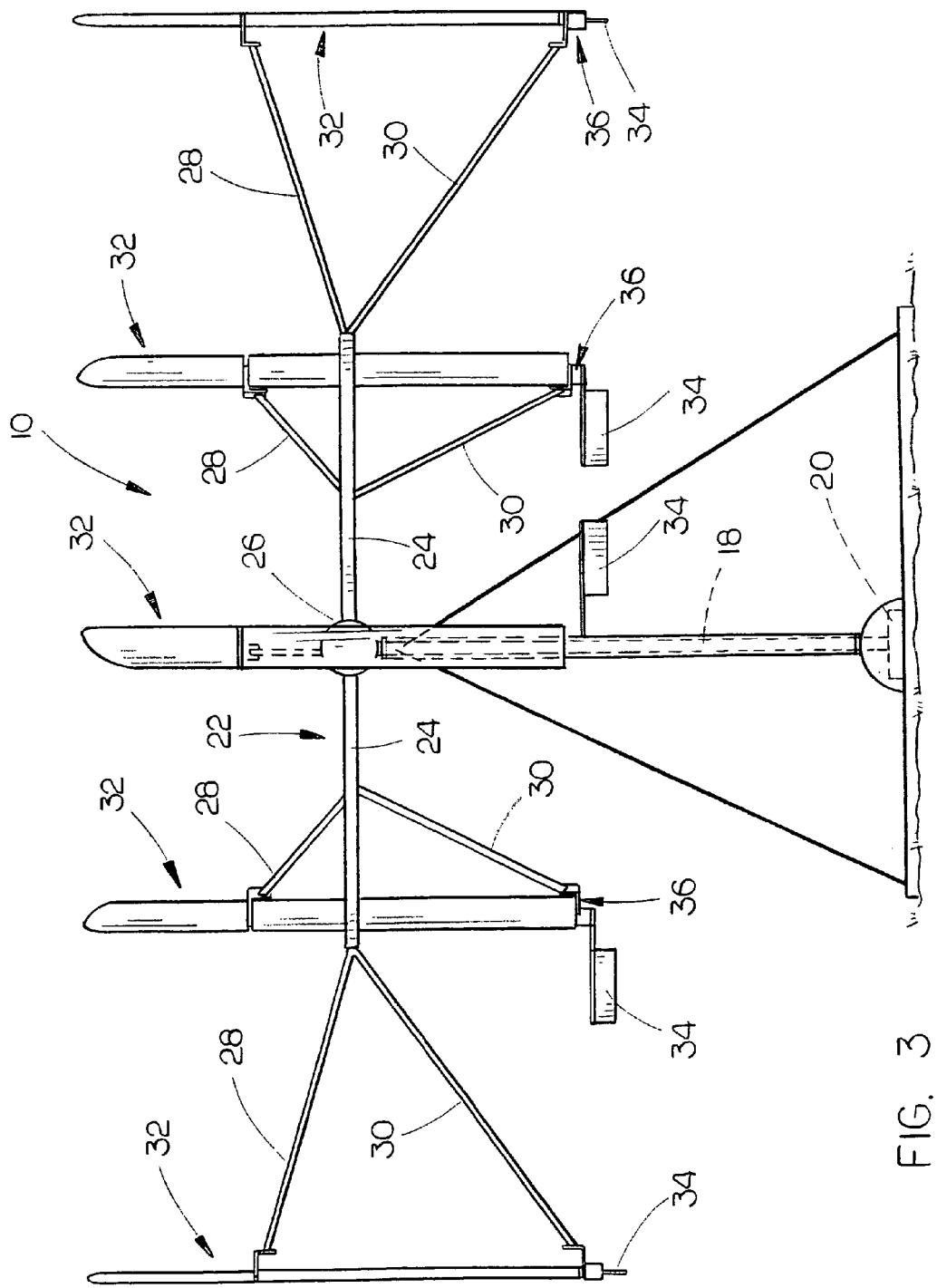
FIG. 3 is a side elevational view of the embodiment of FIG. 1.

FIG. 3 illustrates the various positions of the blades 32 during a specific point of a revolution of the system 22 when the wind is coming from the right side of FIG. 3.

Figure 4:
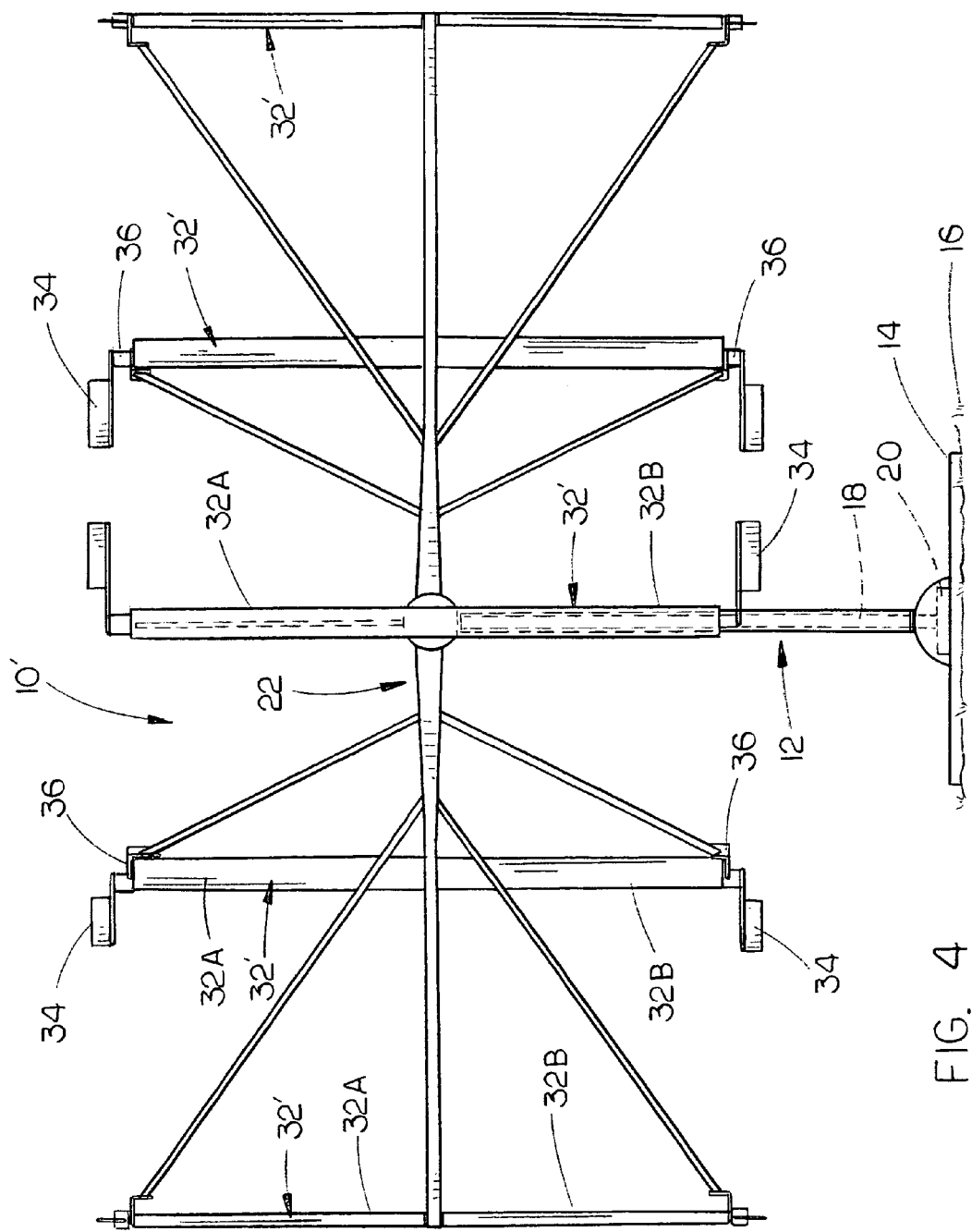
FIG. 4 is a side elevational view of a second embodiment of the invention.

FIG. 4 illustrates a second embodiment of the wind turbine and which is identified by the reference numeral 10'. The difference between the wind turbines 10 and 10' is that the blades 32' in wind turbine 10' have an upper blade portion 32A and a lower blade portion 32B with those blade portions being pivotally movable, about a vertical axis, with respect to each other. Another difference is that each of the blade portions 32A and 32B has a wind vane 34 associated therewith a mechanism 36 being associated with each wind vane 34.

Figure 5:
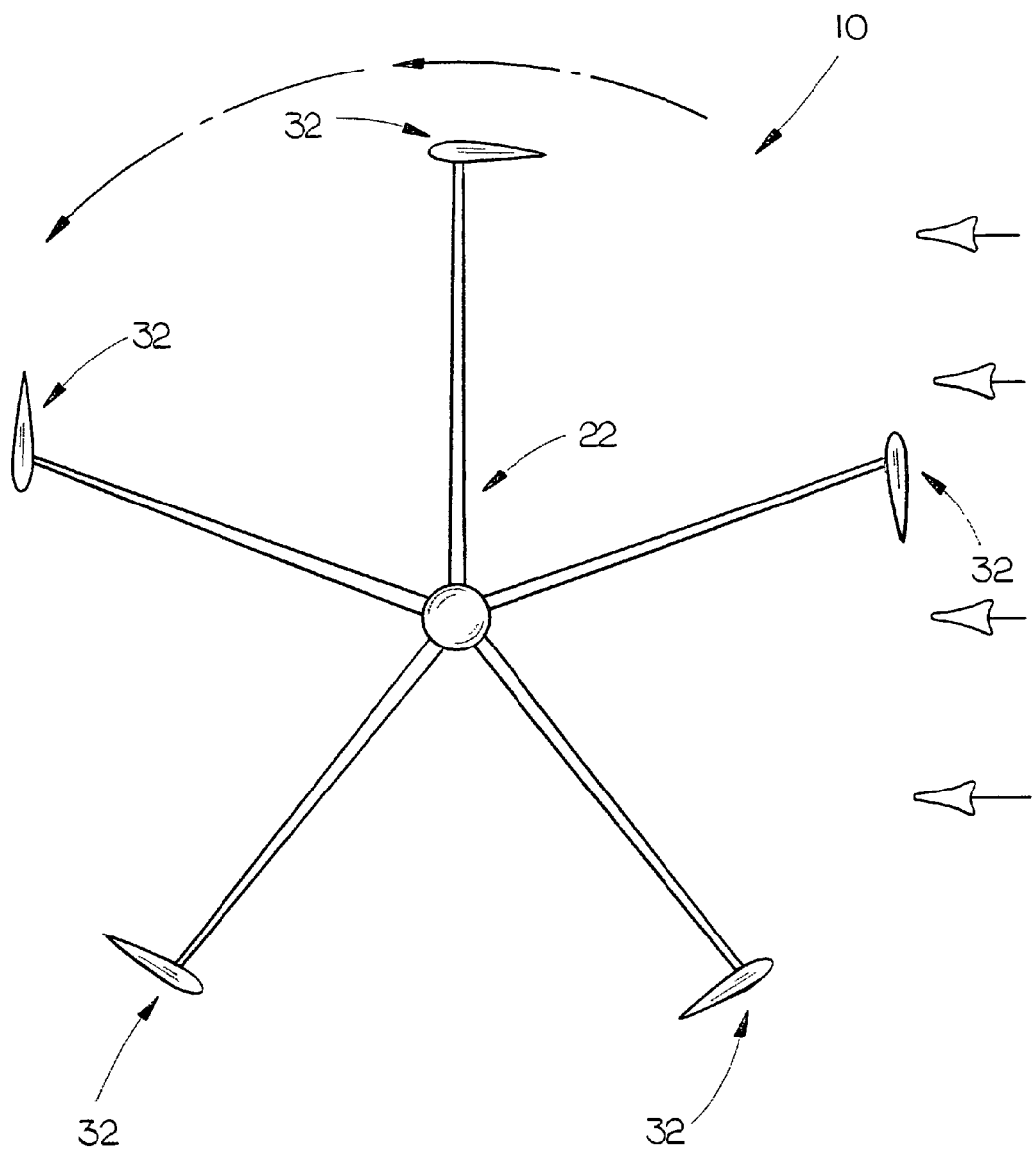
FIG. 5 is a schematic top view of the embodiment of FIG. 1.

FIG. 5 is a schematic view illustrating the positions of the five blades 32 at a particular point in the revolution of the system 22 when the wind is blowing in the direction depicted by the arrows.

Figure 6:
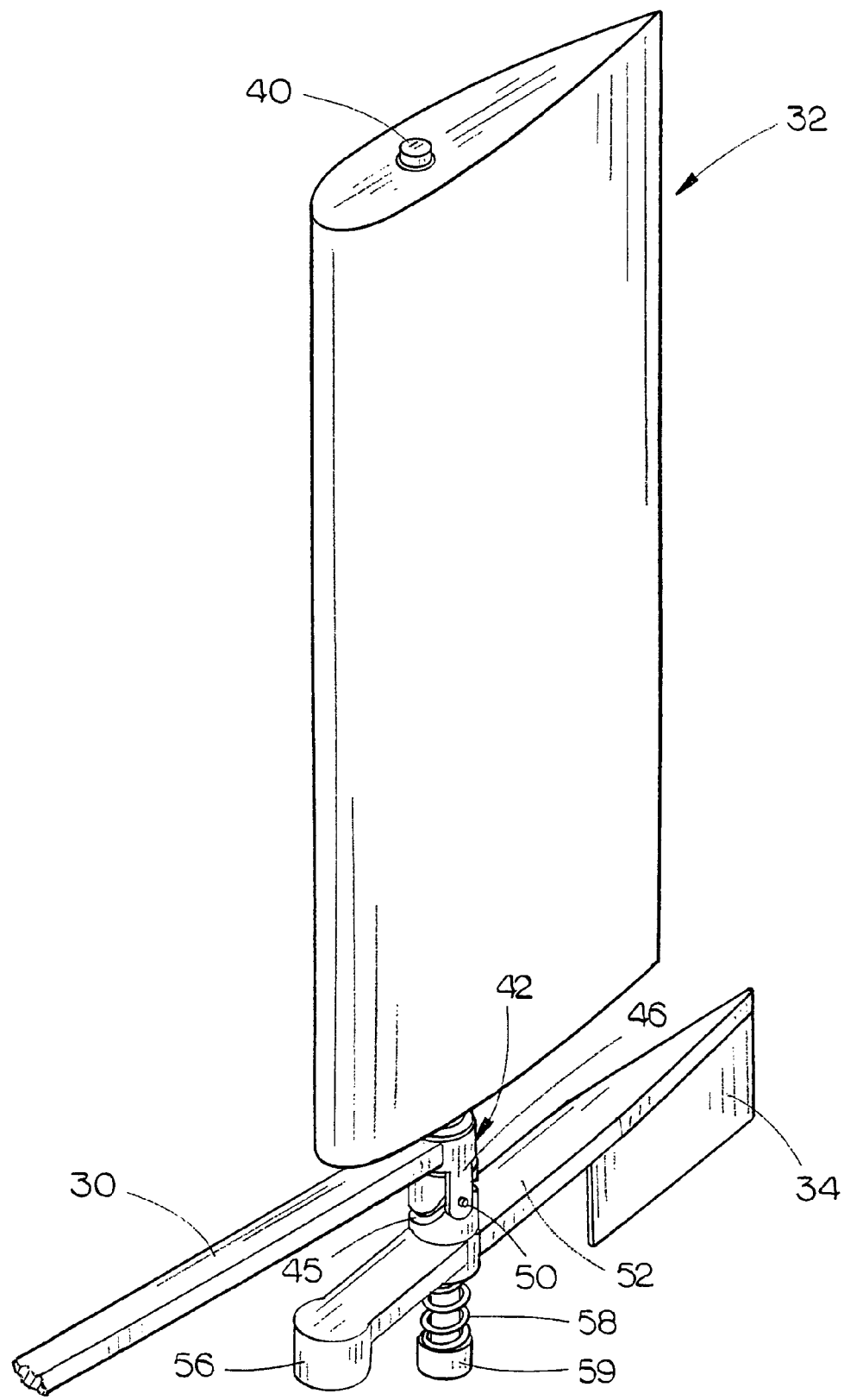
FIG. 6 is a partial perspective view of one of the blades of the embodiment of FIG. 1 and the means for pivoting the blade relative to its support arm.

FIG. 6 is a perspective view illustrating one of the blades 32 and its relationship to the wind vane 34 and actuating mechanism 36. A vertically disposed shaft 40 is secured to and extends upwardly through blade 32. The lower end of shaft 40 rotatably extends downwardly through the outer end of brace 30 and which is received in a tubular cam or cam block 42 having a central helically splined opening 43 extending therethrough. Shaft 40 has a helical spline member 44 secured thereto for rotation therewith which is in mesh with the splined opening 43 of cam block 42. Cam Block 42 has an arcuate cam groove 45 formed in its exterior surface. An arm 46 extends downwardly from brace 30 and has a roller 50 mounted thereon which is received in the cam groove 45. Cap 51 closes the lower end of cam block 42.

Wind vane 34 has an arm 52 extending therefrom which is secured to cam block 42. An arm 54 extends from cam block 42 and has a counter weight 56 secured to the outer end thereof. Cam block 42 is rotatably and vertically movable with respect to shaft 40. Spring 58 is mounted on the lower end of shaft 40 between nut 59 and cap 51 and supports the weight of vane assembly 34, 52, 54, 56 and cam block 42.

Figure 7:
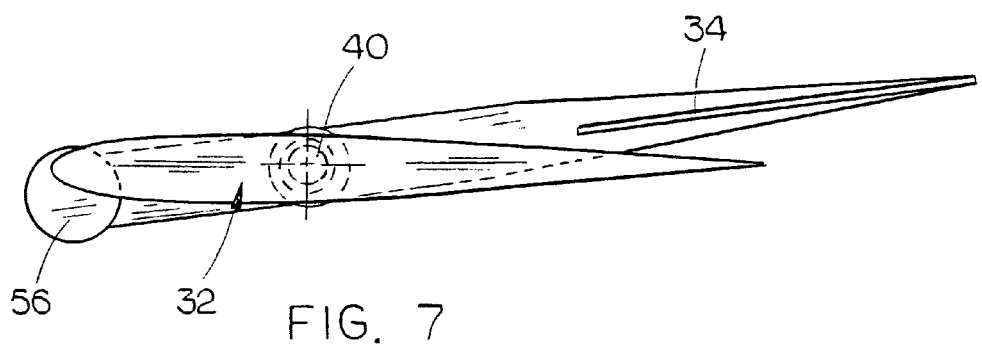
FIG. 7 is a top elevational view of the structure of FIG. 6.
Figure 8:
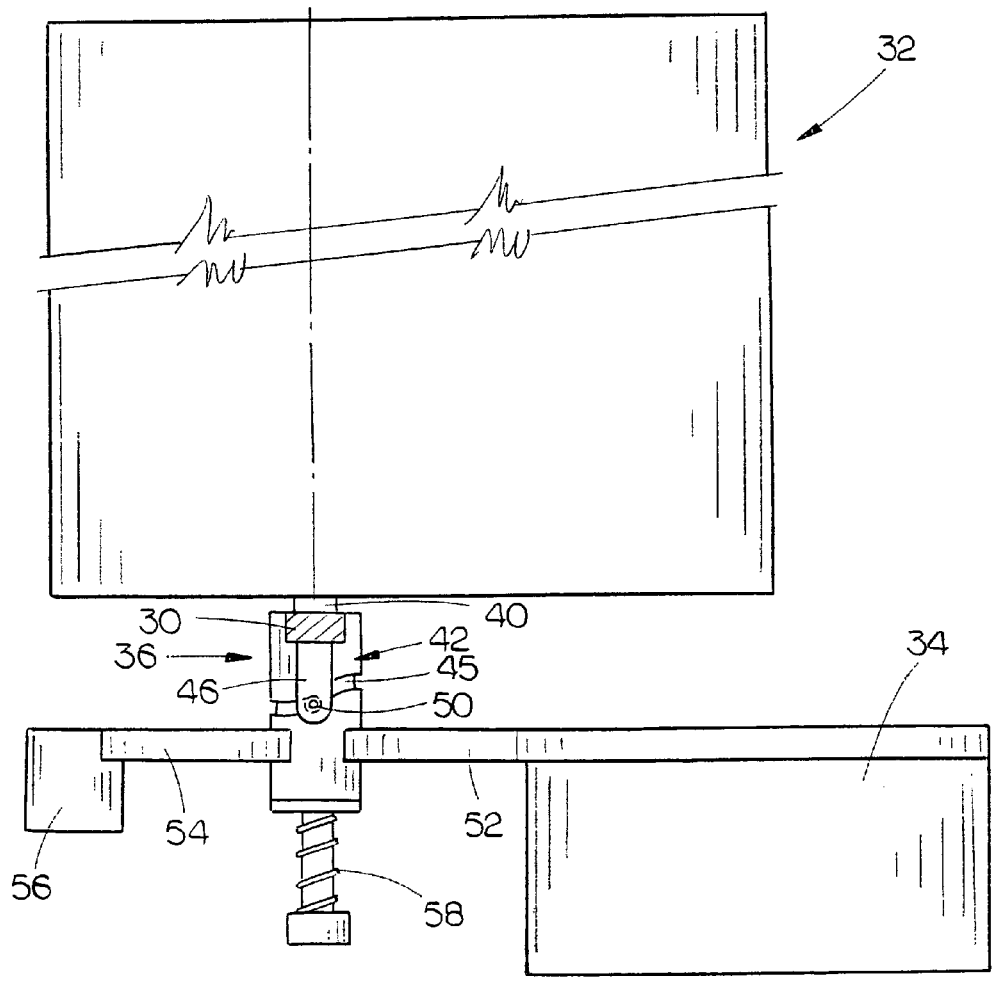
FIG. 8 is a partial side view of the structure of FIG. 6.
Figure 9:
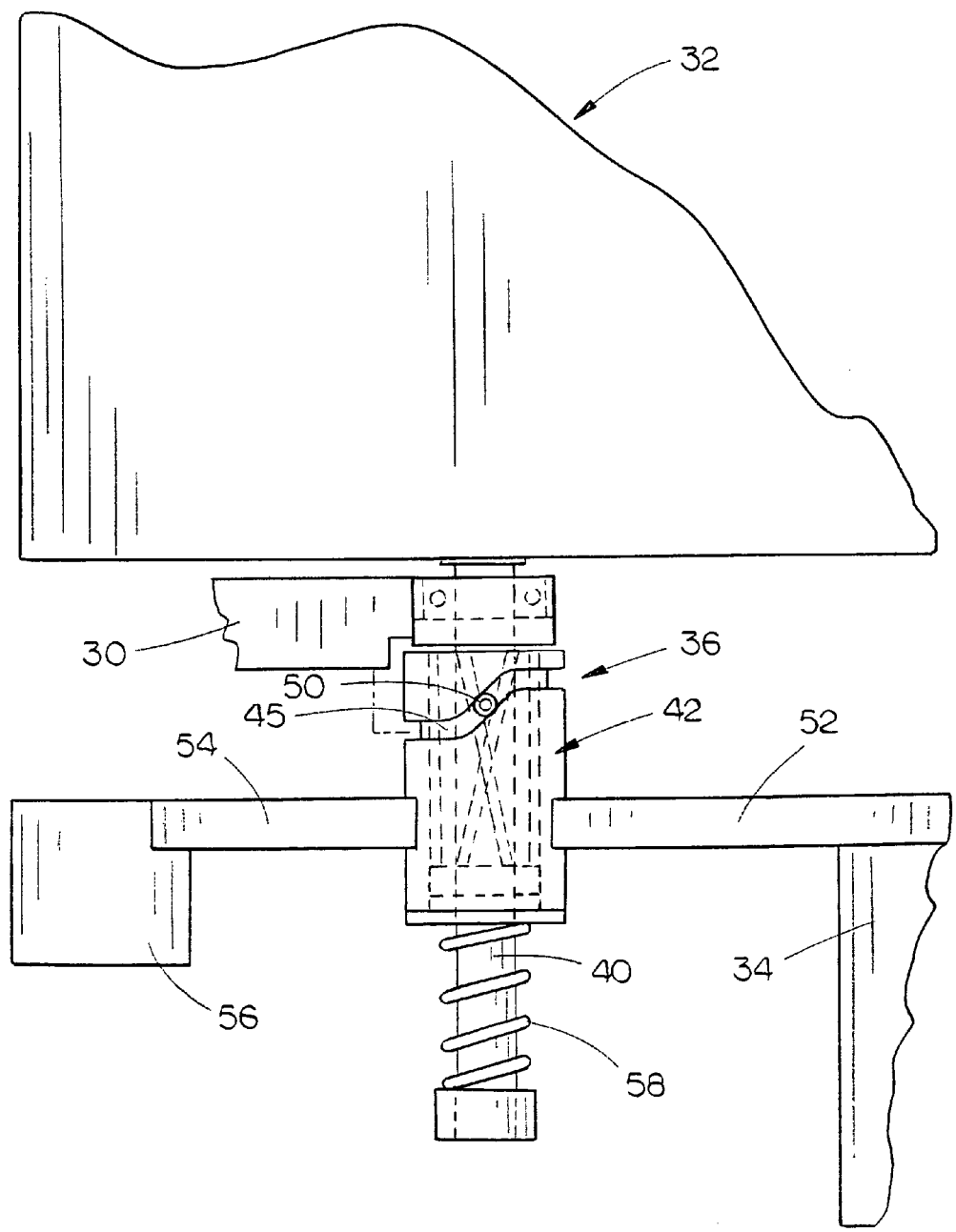
FIG. 9 is a partial side elevational view of the structure of FIG. 6.
Figure 10:
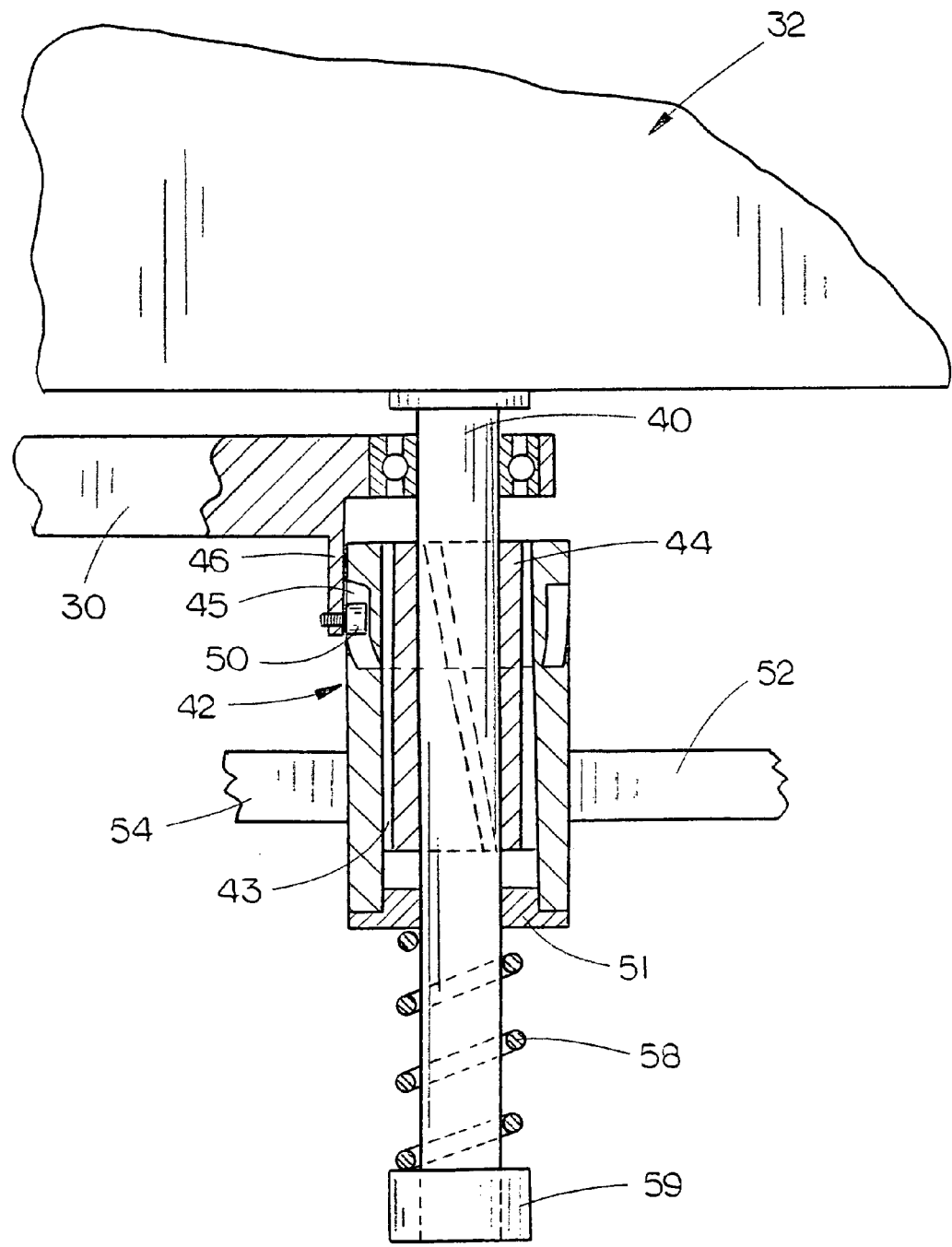
FIG. 10 is a partial sectional view of the structure of FIG. 6.
Figure 11:
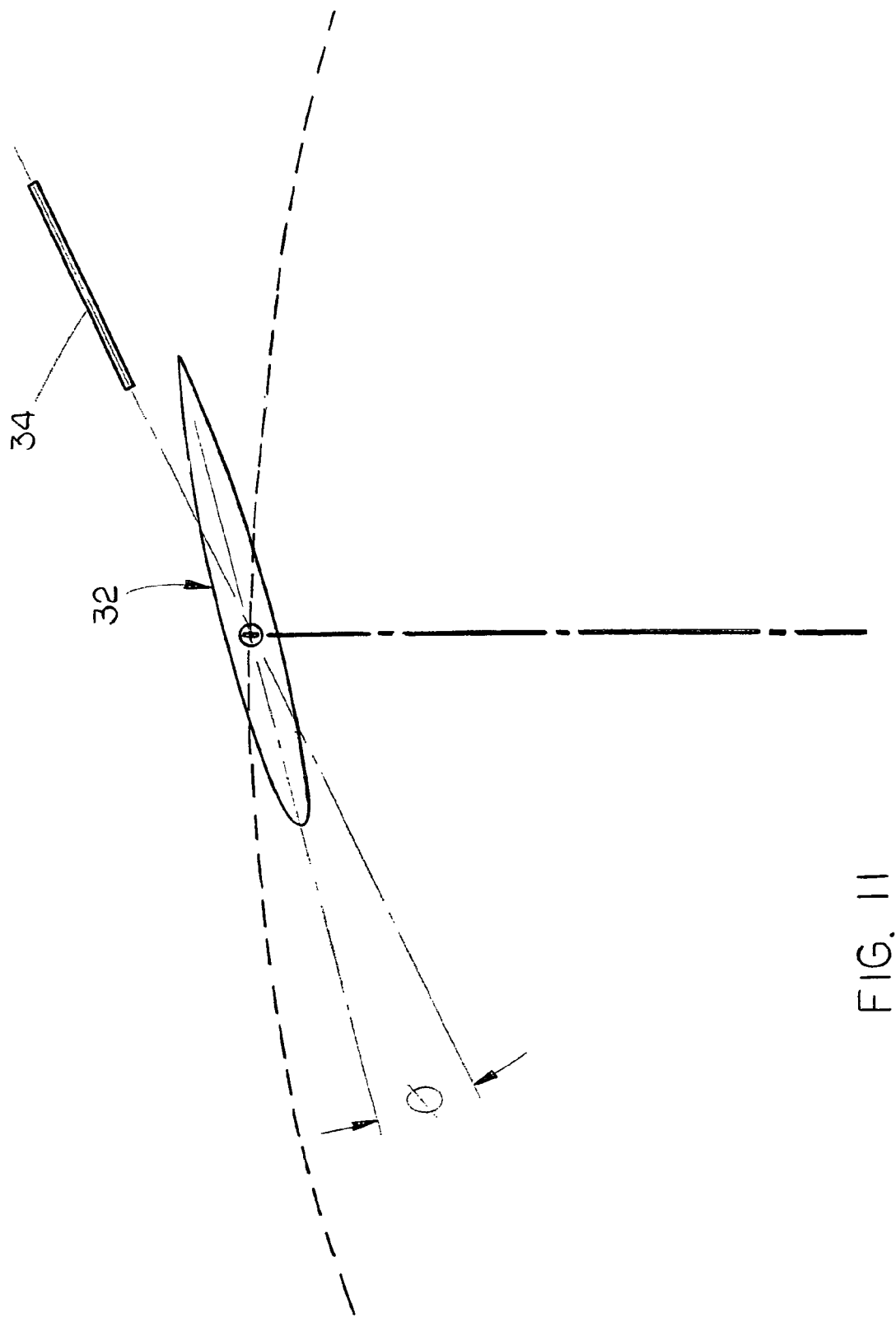
FIG. 11 is a schematic view of one of the blades of the structure of FIG. 6, and FIGS. 12-15 are schematic views illustrating the positions of a blade with different wind directions.

Thus pivotal movement of wind vane 34, which is caused by the wind, causes cam block 42 to rotate with respect to roller 50 which causes cam block 42 to rise or fall due to the interaction of the roller 50 and cam groove 45. Rotation of cam block 42 also causes the rotation of helical spline member 44 and shaft 40 due to the interaction of the helical meshing splines of cam block 42 and helical spline member 44 which causes blade 32 to pivot or rotate somewhat so that the blade 32 is not exactly aligned with respect to the wind flow but is slightly offset from the airflow to create a "lift" so that the blade 32 will be urged to move faster than the speed of the wind. In other words, the blade 32 is pivoted or rotated slightly to change the "angle of attack" of the blade with respect to the wind flow as seen in FIG. 11. That angle of attack is seen in FIG. 7.

FIGS. 12-15 illustrate various positions of a blade 32 with respect to different revolution positions with respect to wind flows.

Thus it can be seen that the vertical axis wind turbine of this invention accomplishes at least all of its stated objectives. The use of a wind vane for each airfoil blade ensures that the airfoil blades will be properly positioned as the airfoil blades move around tower 12. the use of a wind vane for each blade or blade segment also enables each of the blades or blade segments to be slightly pivoted or rotated with respect to the associated wind vane and the wind flow to create a "lift" or "thrust" to the blade so that the blade will be urged to move faster than the speed of the wind as described above.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A vertical axis wind turbine, comprising:
a vertically disposed tower having upper and lower ends;
a drive shaft rotatably mounted in said tower which has upper and lower ends;
a plurality of radially spaced airfoil supports secured to said drive shaft at the upper end thereof which extend outwardly therefrom;
a generally vertically disposed airfoil blade pivotally secured, about a vertical axis, to the outer end of each of said airfoil supports;
each of said airfoil blades having a leading edge and a trailing edge;
a wind vane operatively secured to each of said airfoil blades which causes pivotal movement of the associated airfoil blade relative to the associated airfoil support in response to wind direction;
and a mechanism interconnecting each of said airfoil blades to the associated wind vane which causes pivotal displacement of the airfoil blade with respect to the associated wind vane with the said pivotal displacement being of a magnitude and direction to cause a forward thrust to the airfoil blade from wind acting on the airfoil blade;
said mechanism comprising a vertically disposed shaft which is fixedly secured to the airfoil blade with the said shaft having a lower end which extends downwardly from said airfoil blade, an externally helically splined member secured to said shaft in a fixed manner for rotation therewith, a cam block, having upper and lower ends; said cam block being operatively secured to the outer end of the associated airfoil support; said cam block having a vertically disposed helically splined central opening formed therein; said helically splined member on said shaft being positioned in said helically splined central opening in said cam block so that the splines thereof are in mesh with the splines of said splined central opening; said cam block having an arcuate cam groove formed in its exterior surface; a cam roller operatively connected to said airfoil support; said cam roller being received by said cam groove, whereby pivotal movement of said wind vane will cause said cam block to be rotated with respect to said cam roller and vertically moved which causes said externally splined member to be rotated thereby causing said shaft and said airfoil blade to be rotated so that said airfoil blade is not exactly aligned with respect to the wind flow to create a lift to said airfoil blade so that said airfoil blade is urged to move faster than the speed of the wind.

* * * * *